Patented June 21, 1938

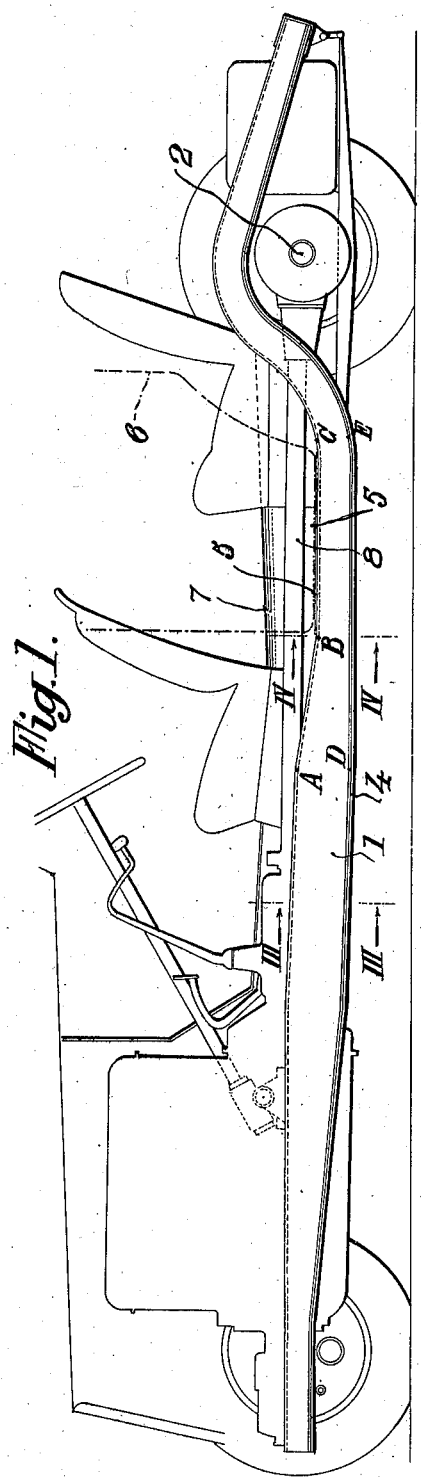

2,121,497

UNITED STATES PATENT OFFICE 2,121,497

CHASSIS-FRAME FOR AUTOMOBILE VEHICLES

Georges Broulhiet, Paris, France

Application October 10, 1936, Serial No. 105,137
In Belgium October 18, 1935

3 Claims. (Cl. 280—106)

The present invention relates to chassis-frames having tubular side members, for automobile vehicles.

The object of the present invention is to provide a chassis-frame of this type which is better adapted to meet the requirements of practice than similar chassis-frames made up to the present time.

The essential feature of the present invention consists in lowering the upper outline of the chassis-frame side members in the portion thereof that is to be located under a portion at least of the floor of the vehicle, and in these portions of the chassis-frame, in reducing the height of said side members and increasing the width thereof.

Other features of the present invention will result from the following description of a specific embodiment thereof.

A preferred embodiment of the present invention will be hereinafter described, with reference to the accompanying drawing, given merely by way of example, and in which:

Fig. 1 is a longitudinal elevational view of a chassis-frame with tubular side members for an automobile vehicle, made according to the present invention;

Fig. 2 is a plan view of one half of this chassis-frame, corresponding to Fig. 1;

Fig. 3 is a cross sectional view of a side member of the chassis-frame, on the line III—III of Fig. 1;

Fig. 4 is a similar sectional view on the line IV—IV of Fig. 1.

In a chassis-frame with tubular side members according to the present invention, intended for an automobile vehicle, the following features are remarkable, as illustrated by the drawing:

Two tubular side members I are given, in plan view, any suitable general shape, for instance a rectilinear general shape.

In elevational view, the upper outline of the side members is lowered, or deflected downwardly in the part thereof corresponding to at least a portion of the floor of the vehicle, and the height of these parts of the side members is reduced, whereas their width is increased.

This reduction of the height of the side members can, if necessary, apply to any portion of the vehicle supporting a floor, that is to say as well at the place of the floor of the front seats as at the place of the floor of the rear seats.

In the drawing, it is merely by way of example that I have shown, and will hereinafter describe, an embodiment of the invention in which the motor-car has two rows of seats and the upper outline of the chassis frame is lowered at the part thereof corresponding to the rear seat compartment.

In this embodiment of the invention, the upper outline of the chassis-frame is given, in its front part, a horizontal rectilinear shape, being very slightly lowered in the vicinity of the front seat compartment.

Then this outline is gradually lowered from A to B (Fig. 1), a distance which may be as high as 6 or 8 centimeters. Said outline is kept at this level as far as point C, corresponding to about the center of the rear seats, from which point it rises steeply, because the side member must be curved upwardly for permitting the necessary vertical displacements of the rear-axle casing 2.

As for the lower outline of the side member, it is gradually lowered from the front in a rearwardly direction as far as a point D located substantially under point A, near the middle part of the vehicle.

This lower outline is then kept substantially horizontal as far as a point E is located substantially under point C, then it is curved upwardly same as the upper outline as far as the rear end of the side member in question.

Therefore, if, at point A, the height of the chassis frame side member averages 17 centimeters, it may be reduced to about 11 centimeters at points B and C.

Between these points A and C, the side members are given a width greater than in other portions of the frame. Preferably, this increase of the width is calculated in such manner that the moments of inertia of the various sections correspond to the desired values, all these values being substantially equal to that the section of the side member would have had if portion BC had not been lowered.

When the side members have, in elevational view, the shape that has just been described by way of example, said side members may be given a substantially uniform width from their front end to point A (this width being, for instance, 10 centimeters).

The width of the side member is then gradually increased between points A and B, for instance up to 17 centimeters. Then this width is reduced from B to C, where the side member again assumes the same width as in the front part thereof.

Thus, the local reduction of height of the side member will not involve a reduction of strength at the place where this reduction of height is effected.

Although, in the manufacture of a side member such as those above described, I may employ any embodiment, I have found that it is particularly advantageous to give the side members a section such as that shown by Figs. 3 and 4, that is to say a section including a part 3 in the form of an inverted U, the ends of the branches of which are connected by a closure plate 4 fixed to the outwardly extending flanges of the edges of part 3.

The advantage of such an embodiment is that the portion of the side member that is of U-shaped section by mere cutting, without jig-sawing, of a stamped metal sheet, for instance in a single operation, directly into its final shape.

In any case, if, in plan view, the side members are given a general rectilinear shape, both side members will be identical to each other and a single set of tools will be sufficient for manufacturing them. Once the side members have been made according to any of the possible manners which are available for carrying out the invention, they are interconnected, so as to constitute the chassis-frame, by as many cross members as are necessary, for instance only two cross-members. The front cross member may, for instance, constitute the front axle and be directly connected with the double thickness flanges provided on the side members over their whole length.

With the structure above described, I obtain a chassis-frame the portion of which extending from B to C will have an upper outline which is very much lowered, so that the floor 5 of the seats can be disposed directly at the level of said outline.

This portion of the outline of the side members may also correspond to the lower outline of the doors 6 of the rear compartment, which permits of placing the floor of this compartment at the same level as the lower edge of the doors. This is a considerable advantage over systems in which recesses are provided for affording space for the feet of the passengers, since these recesses can extend only between the inner faces of the side members, on the one hand, and a median tunnel 7 provided for the passage of the transmission shaft 8.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an automobile having two rows of seats and a floor corresponding to said seats, a chassis frame which comprises, in combination, two tubular side members, and means for interconnecting said side members, each of said side members having an upper outline sloping slightly from the front to a point located under the front row of seats, then sloping to a substantial degree from said point to the front part of the region of the floor corresponding to the rear seats, then remaining horizontal to a point located under the rear seats, and then sloping upwardly, whereas the under outline slopes from the front to the first mentioned point located under the first row of seats, with a greater inclination than the corresponding part of the upper outline, then remains horizontal from said first mentioned point to the second mentioned point, located under the rear row of seats, and then slopes upwardly, substantially parallelly to the corresponding part of the upper outline, the part located under the region of the floor corresponding to the rear seats being of greater width than the remainder of said side member.

2. In an automobile vehicle having a seat and a floor in front of said seat, a chassis-frame which comprises, in combination, two tubular side members and means for interconnecting said side members, each of said side members having its upper face lowered in the portion thereof that corresponds to at least a part of said floor in front of the seat, and being of reduced height and increased width along said portion and having the lower face of such portion substantially aligned with the lower face of the adjoining portion in front thereof.

3. In an automobile vehicle having front and rear seats, and having a floor portion in front of the rear seat, a chassis-frame which comprises, in combination, two tubular side members, and means for interconnecting said side members, each of said side members having its upper face lowered in the portion thereof that corresponds to at least said floor portion, and being of reduced height and increased width along said portion, and having the lower face of such portion substantially aligned with the lower face of the adjoining portion in front thereof.

GEORGES BROULHIET.